Karl Zängl
INVENTOR.

BY Karl G. Ross
AGENT.

Dec. 21, 1965     K. ZÄNGL     3,224,471
APPARATUS FOR INFLATING A RUBBER TUBE
Filed May 31, 1962     2 Sheets-Sheet 2

Karl Zängl
INVENTOR.

BY Karl F. Ross

AGENT.

United States Patent Office 3,224,471
Patented Dec. 21, 1965

3,224,471
APPARATUS FOR INFLATING A RUBBER TUBE
Karl Zängl, Kantstrasse 10, Munich 13, Germany
Filed May 31, 1962, Ser. No. 198,956
7 Claims. (Cl. 141—38)

My present invention relates to the inflation of rubber tubes with introduction of a protective fluid into the tube during the inflation operation.

In certain manufacturing processes such as the curing, retreading and recapping of vehicular tires use is made of an inflatable rubber tube to form an inner core within a two-part mold in which the desired treatment proceeds under heat and pressure. It has been found advantageous to inject into the tube a certain amount of a protective fluid, such as a mixture of glycerol and water, to maintain the plasticity of the rubber and to forestall internal adhesions, thereby avoiding premature aging of the tube and protecting it from structural damage. The introduction of such fluid into a tube of this type has heretofore been handled rather haphazardly by manual means, with resulting irregularity of application and often inadequate distribution of the liquid over the internal surfaces of the tube.

The general object of my present invention is to provide means for automatically and therefore uniformly and invariably admitting a measured amount of such fluid into a tube together with gas under pressure (generally air) used in the inflation thereof.

A related object is to provide a method of conveniently introducing a mixture of high-pressure gas and protective fluid into such tube.

These objects are realized, in accordance with my present invention, by the provision of a mixing chamber adapted to receive a measured amount of the protective fluid from a storage receptacle therefor, the connection between the receptacle and the mixing chamber being cut off while gas under pressure is allowed to pass through the chamber into the tube with entrainment of the encountered fluid which undegoes suitable dispersion during such encounter.

In order positively to insure the closing of the connection between the mixing chamber and the fluid receptacle during the inflation step, I prefer to provide automatic means for briefly opening a valve in that connection when the gas supply if cut off and for maintaining this valve closed at all other times. To this end I may utilize a pneumatic piston which is biased, e.g. by a spring, to draw a limited amount of liquid from the receptacle into the cylinder and which can be actuated during the inflation step by the pressure of an incoming gas, against its biasing force, to drive the previously aspirated liquid into the mixing chamber while concurrently blocking the influx of fresh liquid from the reservoir; such a system advantageously includes two check valves respectively positioned upstream and downstream of the piston cylinder in the conduit leading from the reservoir to the mixing chamber. It is also possible, pursuant to another feature of the invention, to obtain the desired effect by an electrical control circuit including a starting switch for operating a first valve to admit the protective fluid into the mixing chamber, a first timing circuit such as a slow-acting relay for closing this valve a predetermined period after it has been opened, and a second timing circuit for opening a second valve to initiate the flow of inflating air through the mixing chamber subsequently to the closure of the first valve. In the preferred utilization of my invention, in which the tube to be inflated forms an insert for a tire mold, the second timing circuit may be constituted by an otherwise conventional mold-closing mechanism which starts the inflation of the tube as soon as the mold is completely closed. Since such closure usually requires considerably more time than the feeding of the desired amount of protective liquid (e.g. from 0.5 to 2 cc.) into the mixing chamber, the mold-closing operation can be started either concurrently with the opening of the first valve or shortly thereafter, e.g. upon the reclosure thereof. Inasmuch as some tire molds can also be operated without an inner tube and with direct admission of high-pressure air into a tire body to be retreaded or recapped, as more fully described in my copending application Ser. No. 199,126, filed on even date herewith and now abandoned, it is desirable with either type of apparatus to provide means for optionally discontinuing the inflow of protective fluid into the mixing chamber; this may be accomplished with the aid of a separate shut-off valve or purely electrically by a suitably connected circuit breaker.

The above and other objects, features and advantages of my invention will become more fully apparent from the following detailed description, reference being made to the accompanying drawing in which.

Figure 1:
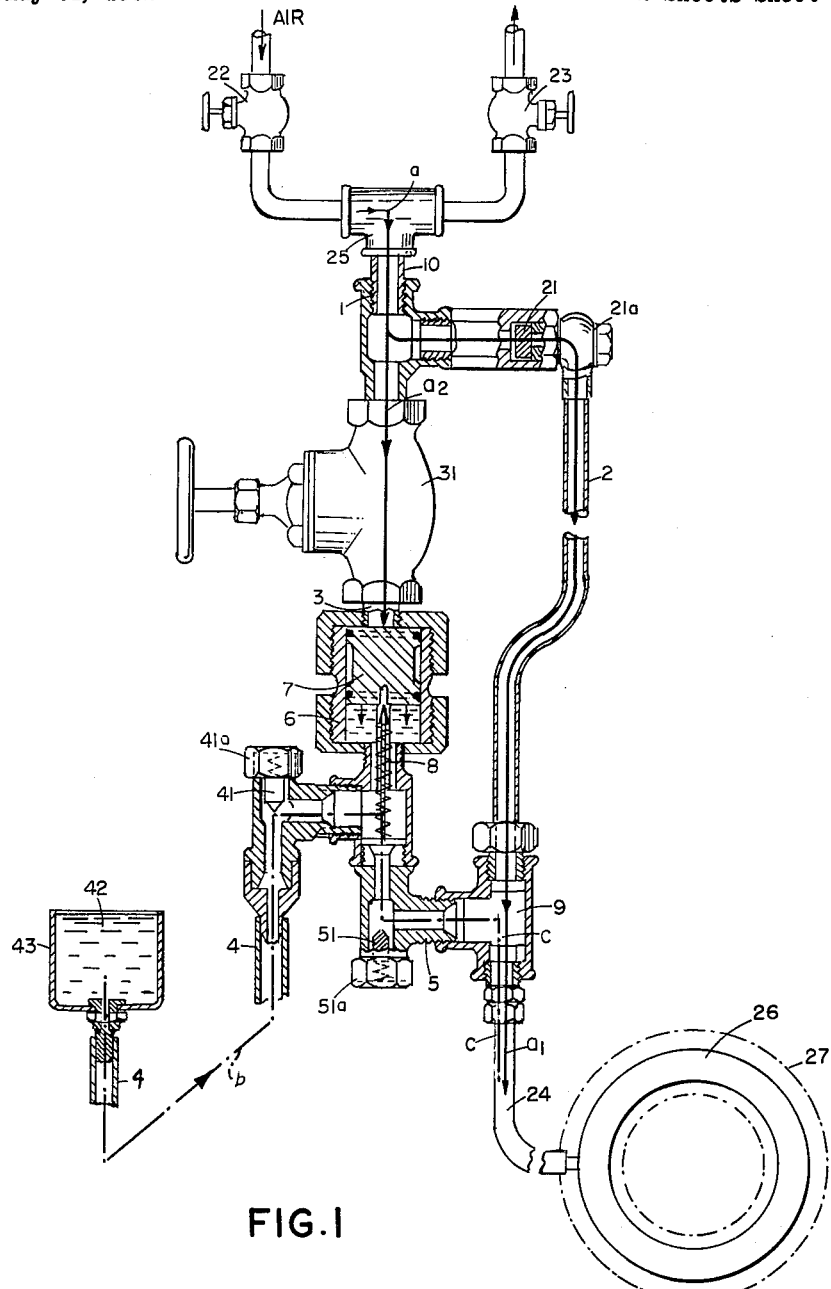
FIG. 1 is a somewhat diagrammatic view of a pneumatically controlled system for admixing a protective liquid with a high-pressure air stream.

In FIG. 1 I have shown an air-inlet pipe 10 communicating via a T-junction 1 with two conduits 2, 3. Inlet pipe 10 extends from another T-junction 25 into which high-pressure air from a suitable source (not shown in this figure) can be selectively admitted by way of a valve 22 and from which such air may also be discharged into the atmosphere by another valve 23. A throttle valve or damper, such as the valve 21 with adjusting head 21a, determines the division of the air flow between the two branches 2 and 3. Conduit 2 terminates at a mixing chamber 9, again in the form of a T-junction, whose other inlet is connected via a conduit 5 to the lower end of a cylinder 6 containing a piston 7. Conduit 3, which includes a shut-off valve 31, opens into the cylinder 6 above its piston. A biasing spring 8 tends to maintain the piston 7 in its raised position. An extension 4 of conduit 5 leads to a receptacle 43 which serves as a reservoir for a protective liquid 42 as heretofore described. The passage 4, 5 includes two check valves 41 and 51, these valves being respectively positioned upstream and downstream of the location at which that passage is connected to cylinder 6. Mixing chamber 9 discharges through an outlet 24 into a rubber tube 26 which is disposed in a tire mold schematically indicated at 27. A measured amount of the liquid 42 is accumulated in cylinder 6 below piston 7.

In operation, the opening of valve 22 causes a flow of air under pressure, indicated at $a$, to enter through junction 1 and to split into two parts $a_1$ and $a_2$ respectively traversing the conduits 2 and 3. The air flow $a_2$ exerts pressure upon pistons 7 and lowers it against the force of compression spring 8, thereby ejecting the liquid stored therein along the path $c$, i.e. through conduit 5 whose check valve 51 has been opened by the existing pressure difference, into the chamber 9 where it is admixed with the main air stream $a_1$ from conduit 2 and atomized thereby. The mixture $a_1$, $c$ thus enters the tube 26 within the closed mold 27 and inflates it, thereby gradually building up a counterpressure which reacts through conduit 5 on check valve 51 and eventually closes it. Thereafter the curing or vulcanizing treatment within mold 27 proceeds in the usual manner with the air-supply valve 22 closed. When the treatment has been completed, discharge valve 23 is opened and the resulting drop in air pressure within conduit 3 initiates the upward movement of piston 7 under the force of spring 8. This movement, in turn, lowers the pressure in conduit 4 to the right of check valve 41 so that this valve opens and allows another measured supply of liquid 42 from reservoir 43 to flow along path *b* into the cylinder 6 under the receding piston 7, the valve 41 closing as soon as the liquid flow stops upon the filling of the cylinder. Check valve 51 remains closed since no pressure differential sufficient to overcome the force of its loading spring exists thereacross. It will be apparent that the spring pressures of both check vaves 41 and 51 can be readily adjusted by their hexagonal heads 41a and 51a.

Upon the return of the system to its quiescent state, as described above, the cycle can be repeated.

If for any reason no protective liquid is to be injected into the tube 26, shut-off valve 31 is closed to prevent the exertion of air pressure upon piston 7 by way of conduit 3. The piston then remains raised under the control of spring 8 and only the air flow $a_1$ passes through chamber 9.

Figure 2:
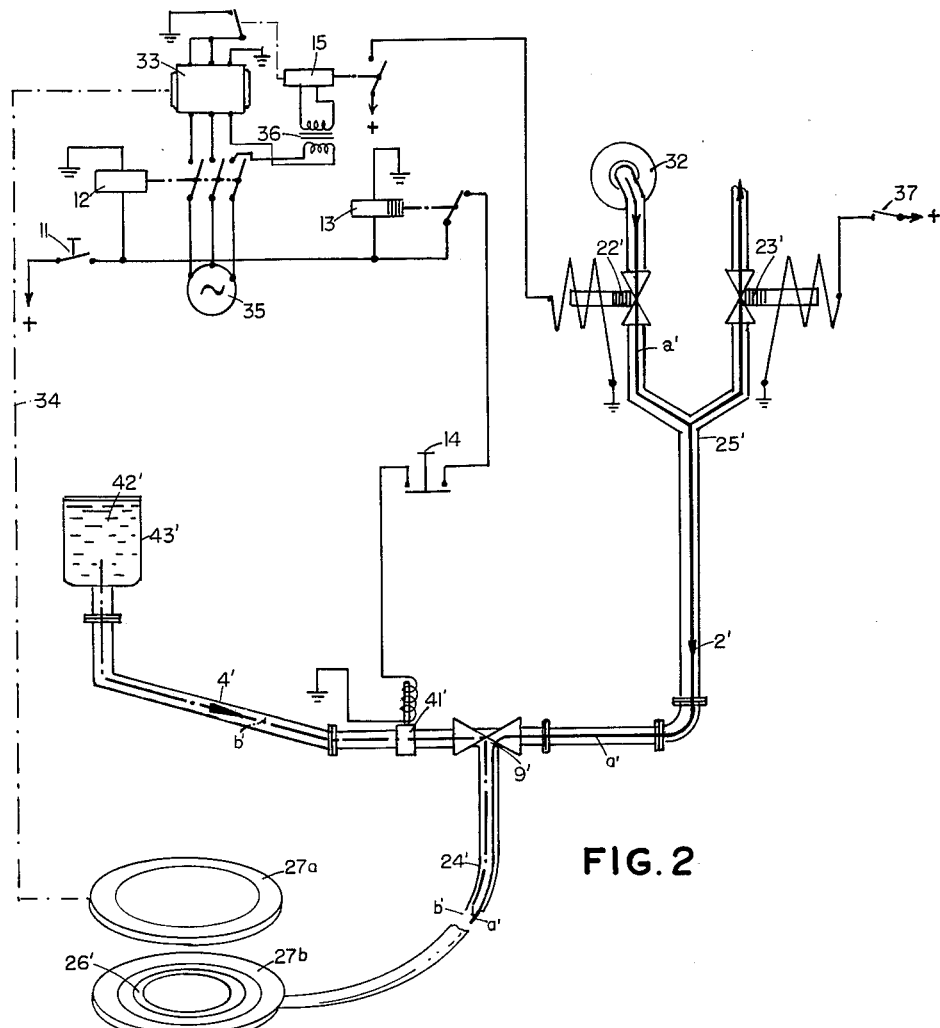
FIG. 2 shows an analogous electromechanical system for the same purpose.

In FIG. 2 I have shown a generally equivalent electrical system in which components analogous to those of FIG. 1 have been designated by the same reference numerals with addition of a prime. A compressor 32 supplies the inflating air to junction 25' by way of inlet valve 2' here shown to be of the solenoid-conrtolled type, the same as outlet valve 23'. Conduit 22', traversed by the air flow *a'*, leads directly to mixing chamber 9' which also receives the liquid flow *b'* via conduit 4' from receptacle 43' containing the liquid supply 42'. A solenoid valve 41' is inserted between conduit 4' and mixing chamber 9' whose outlet 24' delivers the mixture *a'*, *b'* to rubber tube 26'. The mold surrounding this tube is here shown to comprise two halves 27a, 27b illustrated in open position. An alternating-current motor 33 is coupled via a linkage 34, illustrated schematically, with the mold half 27a to close it.

Motor 33 is energizable from a three-phase current source 35 by way of three aramtures of a relay 12 which is connected in parallel with a slow-operating relay 13 across a current source, indicated diagrammatically, in series with a starting switch 11. A current transformer 36 in series with one of the supply leads of motor 33 feeds a relay 15 which, when energized, opens the motor circuit at its left-hand armature and back contact and opens the solenoid valve 22' through its right-hand armature and front contact. The sole armature and back contact of relay 13 are connected to solenoid valve 41' through a circuit breaker 14 which may be simply a plug-and-jack connection. Solenoid valve 23' is operable, e.g. manually, by means of a switch 37.

The slow-operating relay 13 has a delay time designed to allow a measured amount of liquid 42' from reservoir 43' to flow along path *b'* into mixer 9' by way of valve 41'; if this path has a flow capacity of, say, 0.75 to 1 cc./sec., this delay time may be in the range of 0.2 to 2 seconds.

When the starting switch 11 is closed, solenoid valve 41' opens to admit some of the liquid 42' into mixer 9'. Shortly thereafter, upon the operation of slow-acting relay 13, valve 41' is de-energized so that the liquid supply is cut off. Motor 33, set in motion by the operation of relay 12, has meanwhile begun the closure of the mold 27a, 27b, this operation proceeding against a relatively low resistance so that the current drawn by motor 33 is small and the output of transformer 36 is insufficient to energize the overload relay 15. When the mold closes, the motor current rises sharply and relay 15 operates, thereby stopping the motor and opening the solenoid valve 22' to establish the air flow *a'* from compressor 32 through mixing chamber 9' into tube 26'. The air, as before, atomizes the liquid encountered in the mixing chamber and entrains it into the tube where it is unformly deposited along the internal walls thereof. The subsequent interruption of the air flow by the opening of switch 11 to release the relay 15, the discharge of the air with the aid of switch 37 and the opening of the mold 27a, 27b by manual or electrical means (not shown), e.g. with reversal of motor 33, then complete the cycle.

It will be evident that the admission of liquid to mixer 9' can be optionally prevented by the opening of circuit breaker 14.

Figure 3:
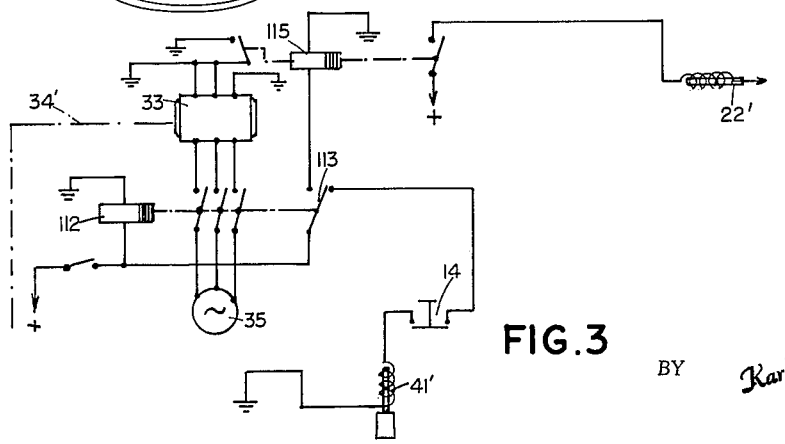
FIG. 3 illustrates a partial modification of the system of FIG. 2.

FIG. 3 shows part of an otherwise identical system with slow-operating relay 112 replacing the relays 12, 13 of FIG. 2; relay 112 has three armatures for the energization of motor 33 and a further armature 113 whose back contact leads via circuit breaker 14 to valve 41' while its front contact is connected in the operating circuit of a relay 115. The operation of this system differs from that of the preceding embodiment in that motor 33 is set in motion not instantaneously upon closure of starting switch 11, thus concurrently with the opening of valve 41', but after a short delay represented by the response time of slow-acting relay 112; relay 115 is sufficiently slow-operating to open the solenoid valve 22' with concurrent de-energization of motor 33 after the closure of the mold. It will be apparent that in this case, too, relay 115 could be connected as an over load relay as illustrated for the relay 15 in FIG. 2.

Further modifications of the specific arrangements described and illustrated are, of course, possible without departing from the spirit and scope of the invention as defined in the appended claims.

I claim:

1. An apparatus for automatically admixing a protective liquid with a stream of air under pressure for the inflation of an elastic tube, comprising a mixing chamber, a receptacle containing a supply of said liquid, a source of said air under pressure, first conduit means connecting said receptacle with said chamber, second conduit means connecting said source with said chamber, outlet means at said chamber for dispensing a mixture of air with said liquid, first valve means in said first conduit means, dosing means coupled with said first valve means for admitting a limited supply of said liquid into said chamber, flow-control means including second valve means in said second conduit means for passing said air under pressure through said chamber with entrainment of the admitted liquid over an interval sufficient to inflate a tube connected to said outlet means, and automatic means responsive to operation of said flow-control means for briefly actuating said first dosing means substantially at the beginning of said interval.

2. An apparatus according to claim 1 wherein said first valve means comprises an upstream check valve and a downstream check valve positioned in cascade in said first conduit means, said dosing means including a storage cylinder connected to said first conduit means at a location intermediate said check valves, piston means in said cylinder and biasing means normally acting upon said piston means in a sense to draw a limited amount of said liquid from said receptacle into said cylinder by way of said upstream check valve while maintaining said downstream check valve closed, said automatic means including a connection leading from said cylinder to a point on said second conduit means downstream of said second valve means for exerting upon said piston means upon the opening of said second valve means an air pressure overcoming the force of said biasing means whereby said upstream check valve is closed and said downstream check valve is opened.

3. An apparatus according to claim 2, further comprising shut-off means in said connection for deactivating said automatic means.

4. An apparatus according to claim 2, further comprising adjustable throttle means in said second conduit means downstream of said point for regulating the air pressure exerted upon said piston means.

5. An apparatus according to claim 1 wherein said first and second valve meeans are electrically actuatable, said flow-control means comprising switch means and delayed-action means responsive to said switch means for opening said second valve means, said automatic means including a circuit closable by said switch means for opening said first valve means, said closing means including timer means controlled by said switch means for closing said first valve means a predetermined period after the opening thereof and prior to the opening of said second valve means by said delayed-action means.

6. An apparatus according to claim 5, further comprising manually operable circuit-breaker means in said circuit for optionally preventing the opening of said first valve means.

7. An apparatus according to claim 5 wherein said delayed-action means includes a motor for closing a mold about said tube and an overload relay connected in an energizing circuit for said motor, said second valve means being connected to be opened by said overload relay upon closure of said mold by said motor.

References Cited by the Examiner
UNITED STATES PATENTS

| 2,308,960 | 1/1943 | Stevens | 141—38 XR |
| 2,699,279 | 1/1955 | Dodge et al. | 222—194 |
| 2,761,601 | 9/1956 | Van Vooren | 141—38 XR |
| 2,812,783 | 11/1957 | Bufogle | 141—38 |
| 2,814,422 | 11/1957 | Mercier | 222—335 |
| 2,991,629 | 7/1961 | Rose. | |

LAVERNE D. GEIGER, *Primary Examiner.*